1,758,668

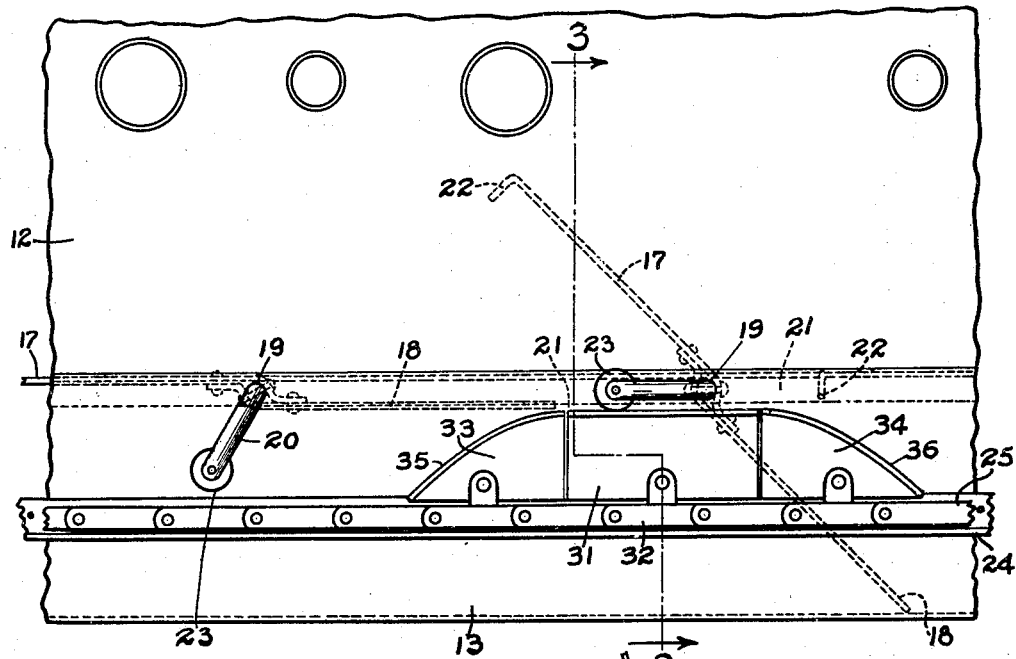
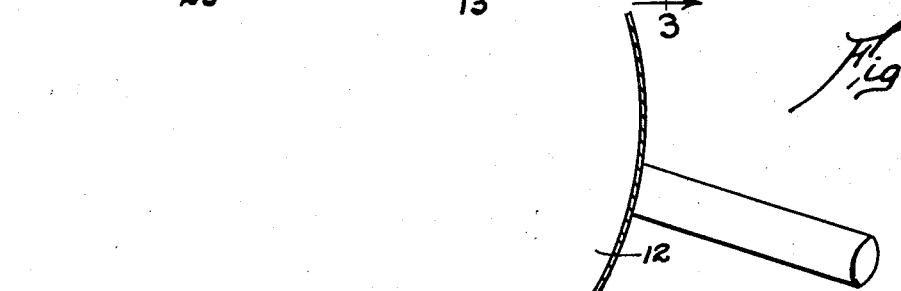
Fig. 2.
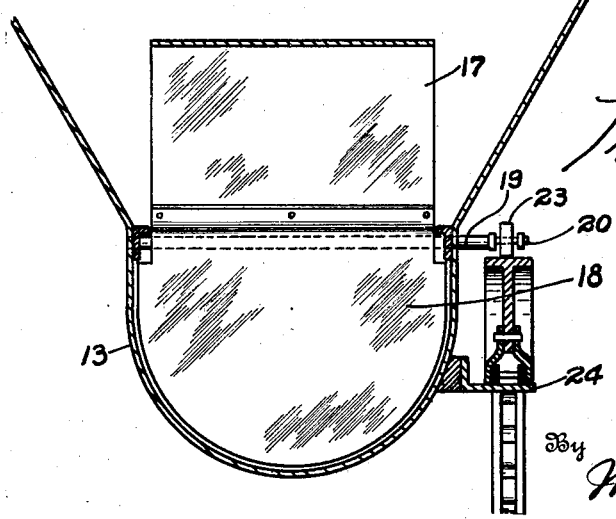
Fig. 3.
Inventor
Sylvester W. Kirk
William Roger Meuttman
By Murray and Gugelter
Attorneys Inventor
Sylvester W. Kirk
William Roger Meuttman
By Murray and Zugelter
Attorneys Patented May 13, 1930

UNITED STATES PATENT OFFICE

SYLVESTER W. KIRK AND WILLIAM ROGER MEUTTMAN, OF CINCINNATI, OHIO, ASSIGNORS TO THE KIRK & BLUM MANUFACTURING COMPANY, OF CINCINNATI, OHIO, A CORPORATION OF OHIO

DUST-COLLECTING SYSTEM

Application filed July 19, 1927. Serial No. 206,975.

This invention relates to a collecting system for conveying and gathering miscellaneous waste and by-product materials such as sawdust, shavings and numerous other kinds of light and heavy materials as may require handling in factories and has for an object the provision of a system whereby a pipe of uniform size may be extended through a plant and which may be tapped at any point throughout its length and branches which will take up waste materials and the like from machines and direct them into said pipes; this system thus obviates the heretofore necessary reconstruction of the collecting system whenever the arrangement of waste producing machines is changed.

Another object is to provide a collecting system wherein the collecting pipe has associated therewith a high velocity conveying pipe arranged for intermittent communication at all points along the length thus permitting a constant emptying and carrying away of the materials received by the collecting pipe.

Another object is to provide novel and efficient means for effecting a single moving communicating aperture between the pipes for emptying the low velocity collecting pipe without the use of a mechanical material moving conveyor of any description.

Another object is to provide a system of this type wherein a relay fan and collector unit, if used, may discharge the usual collected dust into the high velocity conveyor pipe, thereby eliminating any condition favoring explosion which occurs when relay units are permitted to empty into a low velocity pipe which permits expansion of the discharged air and dust.

These and other objects are attained by the means described herein and disclosed in the accompanying drawings, in which:

Fig. 2 shows an enlarged fragmental view of the device shown in Fig. 1.

Fig. 3 is a view taken on line 3—3 of Fig. 2.

Fig. 4 is a fragmental section of a modified form of operating mechanism of this invention.

Figure 1:
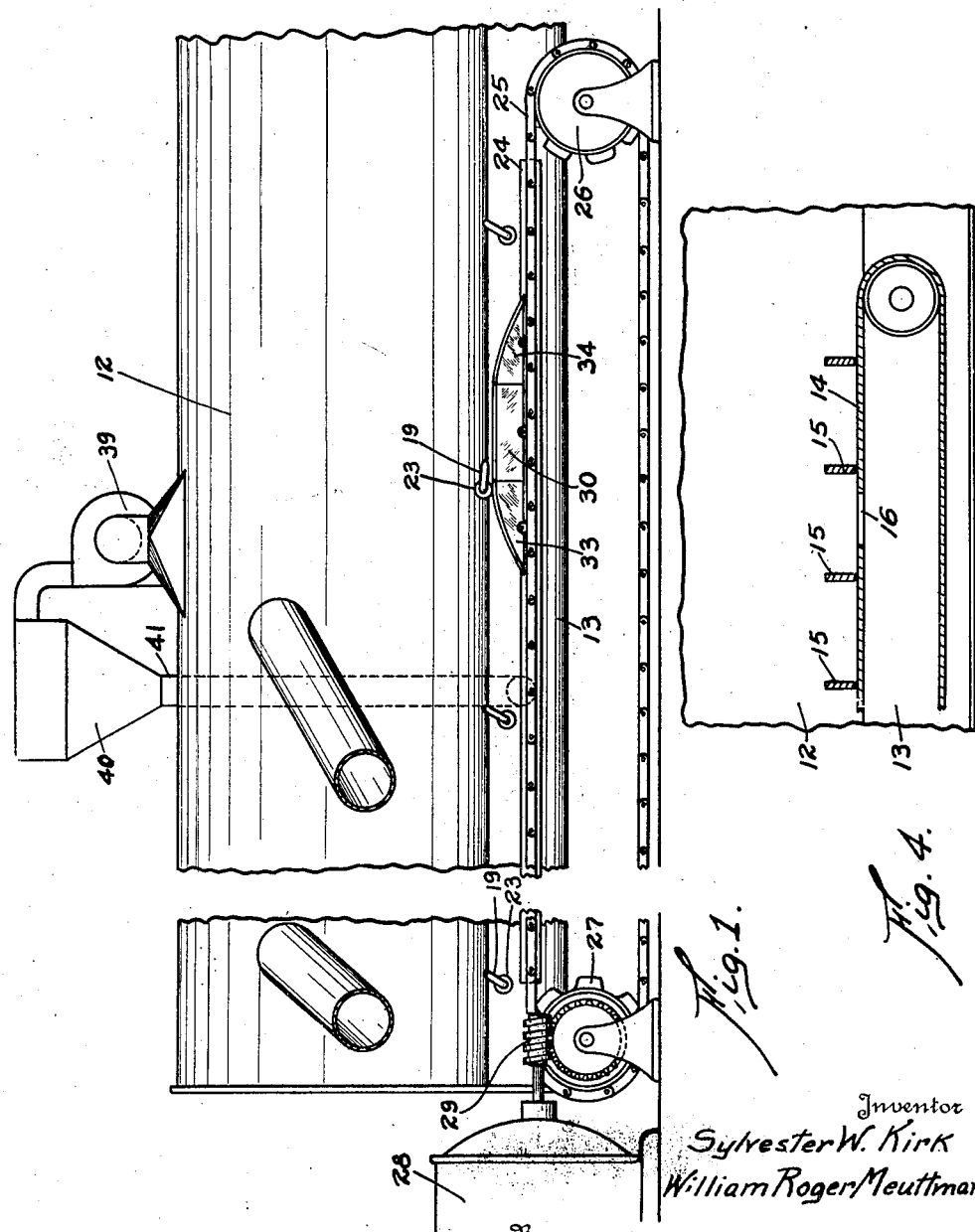
Fig. 1 represents a side elevational view of a collector system of the invention, part being broken away.

In the present embodiment the device of the invention comprises a low velocity pipe 12 having a high velocity conveying pipe or trough 13 connected or integral therewith and extending throughout its length. Any suitable means may be provided for providing a dividing wall common to pipes 12 and 13. This dividing wall is so arranged as to provide a moving communicating port between the pipes 12 and 13. In other words a single communication between the pipes is effected serially throughout the length of the common wall which may take one of several forms of construction. It will be readily apparent that a moving belt with one or two apertures therein may be mounted so as to provide a common wall between the pipes 12 and 13 thus providing a very simple means for carrying out the invention. Fig. 4 is illustrative of this simple form and shows the pipes 12 and 13 employing one section of a belt 14 as a common wall. A series of baffles 15 extend transversely along the lower portion of pipe 12 in order to preclude operation of the belt as a mechanical conveyor. The perforation 16 in the belt would periodically establish communication between the pipes intermediate each pair of adjacent baffles. In the embodiment shown in Figs. 1, 2 and 3 the common wall is made up of a series of pivotally mounted trap doors 17 which are arranged, when closed to form a continuous wall. The trap doors 17 have offset counterbalanced doors 18. These doors are constructed as a unit and are rigidly secured to axles 19 which have roller crank arms 20 disposed exteriorly of the pipes. From the foregoing it will be apparent that upon movement of a given crank arm 20, the trap door 17 will rise in pipe 12 while counter-balanced door 18 will be lowered into the pipe 13. Each of the doors 17 is somewhat shorter than the distance between adjacent axles 19 so that an opening or aperture 21 is provided on each side of the axle 19. In order to effect a complete closure between a given trap door 17 and the counter-balanced door 18 of an adjacent unit, downwardly extending flanges 22 are formed at the rear end of each trap door 17. These abut the top faces of doors 18 when the doors are in closed position.

In order to successively operate the series of trap doors there is provided a wheel or roller 23 on each of the axle cranks 20 so that a suitable moving cam mounted exteriorly of the device may engage the cranks and effect turning of the trap doors by turning the axles 19 about their mountings. As shown in Figs. 1, 2 and 3 an angle iron 24 may be mounted beneath the cranks 20 for supporting a chain 25 carried by sprockets 26 and 27. The sprocket 27 may be power driven from any suitable source and is adapted to be driven at a suitable speed through any desired mechanism, for example a motor 28 having worm and worm wheel driving connection 29 with the sprocket 27. A cam, indicated generally at 30 comprises three parts consisting of a central block 31 which is mounted on one of the links 32 of chain 25 and blocks 33 and 34 connected to adjacent links of the chain. Upon movement of the chain in the direction of the arrows the inclined face 35 of block 33 engages the wheel 23 of a given crank 20 and turns the axle 19 about its mounting thereby raising the trap door 17 and lowering the counter-balanced door 18 to open communication between pipes 12 and 13. As the cam is moved by the chain the wheel 23 rides along the flat topped block 31 holding the trap door open for an interval during which the collected waste matter is permitted to be drawn from the low velocity pipe 12 into the high velocity pipe 13. The inclined relation of the trap door permits gravity to assist in the movement of the heavier materials such as blocks and the like into the high velocity pipe 13. Further movement of the cam then permits the crank 20 to quietly return the door to closed position as the wheel 23 rides downwardly over the oppositely inclined face 36 on the cam block 34.

As one trap door closes, the next successive door is opened so that a constant area of communication is maintained between the pipes. A suitable fan unit is provided at the forward end of the system for effecting a desired relatively low velocity suction in the pipe 12 and to create high velocity movement of air in the pipe 13. The contents of high velocity or conveyor pipe 13 may then be directed into a suitable conveyor pipe 38 which may discharge into any suitable pipe or collector for example a "cyclone type" collector not shown.

Figure 5:
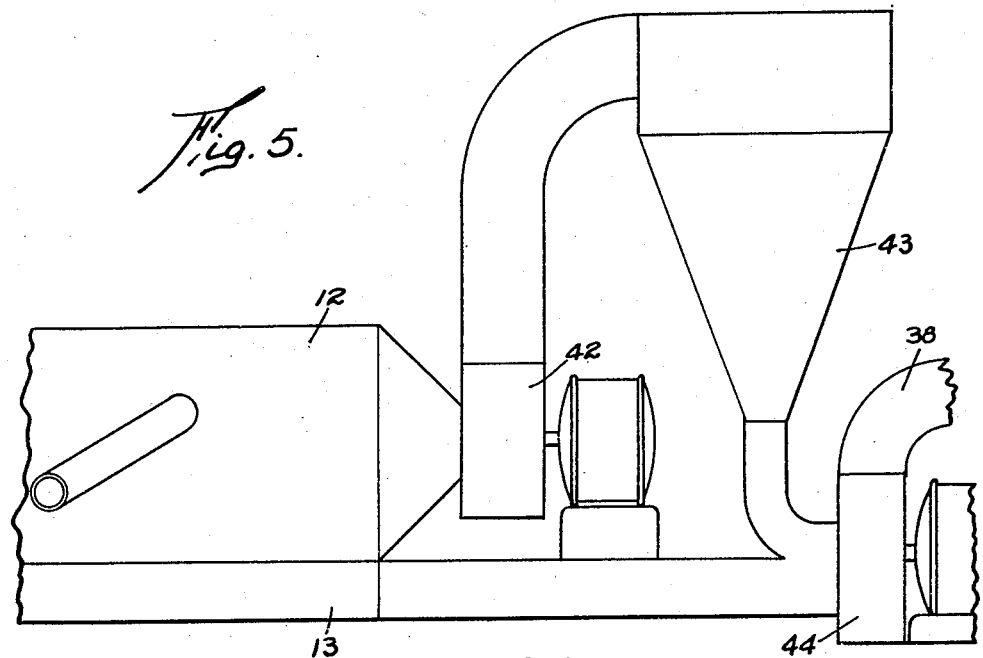
Fig. 5 is a fragmental elevation of one form of fan apparatus and its connection to the structure shown in Fig. 1.

In installations where the distance from the fan to the collector or destination of the material is great, two fans may be used (see Fig. 5). The collecting fan 42 exhausts from the pipe 12 and relays material through a local collector 43 into the conveying fan 44. The fan 44 exhausts from high velocity or conveyor pipe 13 and discharges all the material into pipe 38 by which it is carried to its destination.

Figure 6:
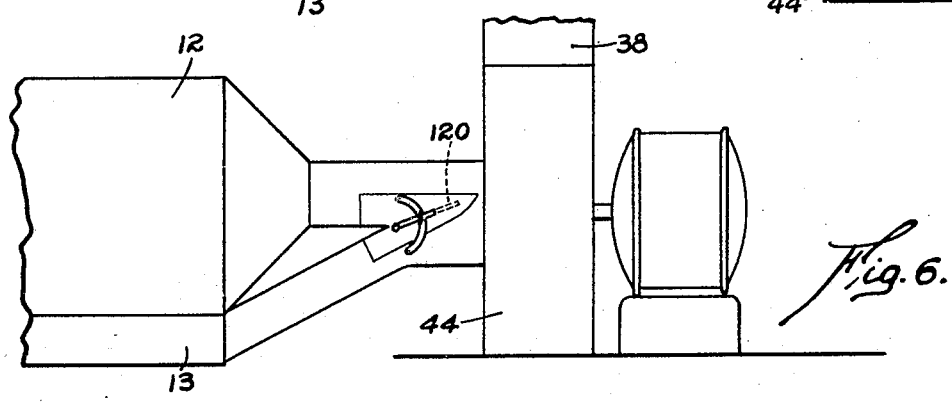
Fig. 6 is a view similar to Fig. 5 showing a modified form of fan arrangement and connection to a structure as shown in Fig. 1.

As shown in Fig. 6 a single fan 44 may be used to exhaust pipes 12 and 13. A suitable reducer is used on pipe 12 and a control blade 120 is provided to regulate the relative rates of exhaust from the pipes. In installations where the span of the pipes 12 and 13 is exceptionally long it is desirable to add one or more auxiliary units comprising a fan 39 and collector 40. The fan 39 is connected to the pipe 12 while the collector 40 is connected by a suitable pipe 41 with the high velocity pipe 13. The fan 39 will remove some of the lighter dust from the pipe 12 and discharge it at high velocity into the pipe 13. By discharging into the high velocity pipe 13 there is eliminated the danger of permitting the dust laden air from pipe 41 to expand, thereby eliminating a condition favorable to explosion and combustion.

While there is shown herein but two expedients for serially effecting communication between the low velocity pipe and the high velocity or conveyor pipe 13 it will be readily understood that other operating means may be provided for effecting this communication. For example the trap doors 17 may be arranged to slightly over-lap one another. Counter-balanced door 18 may be omitted. Furthermore the trap doors may be actuated by means of a series of electromagnets controlled by a slowly moving commutator.

Figure 7:
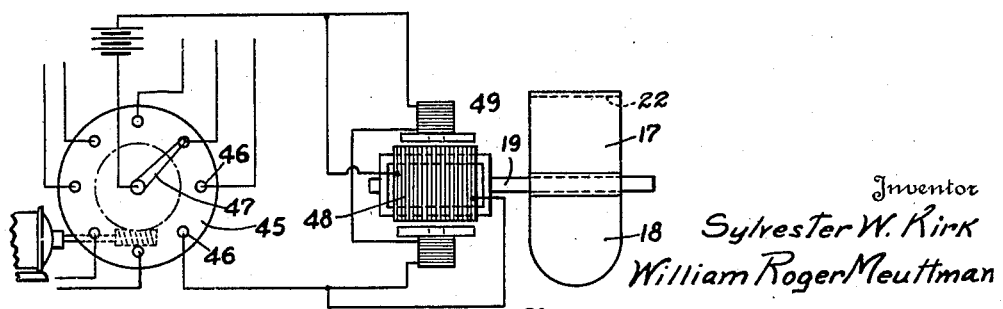
Fig. 7 is a diagrammatic view of an electrically operated apparatus for actuating a trap door structure such as is shown in Fig. 3.

In Fig. 7 there is shown diagrammatically an operative arrangement for this purpose. A commutator 45 having spaced contacts 46 and a relatively movable contact arm 47 periodically energizes armatures 48 and field magnets 49 which are associated with each of the axles 19. The armatures are carried by the axles and the field magnets or poles are fixed so that limited rotary movement is imparted successively to each of the axles as the several segments 46 are contacted by arm 47. This structure, it will be noted, replaces the chain and cam structure shown in Figs. 1 and 2. The system of this invention adapts itself to economical and very effective operation especially in large plants wherein the arrangement of waste producing machines is altered from time to time. With the formerly used high velocity type of collecting system it was necessary to gradually increase the size of the pipe in proportion to the number of machines connected thereto at various points throughout its length. Such installations were always installed to a given factory layout of machines and required reconstruction amounting in some cases to a complete new installation when the plan of the factory was altered. In the present invention the pipes 12 and 13 are permanently installed to accommodate any number of machines within given reasonable limits. This installation is permanent and the branch pipes may be tapped in at any point, or they may be removed and the holes capped as necessity of machine layout may demand.

The noisy and rapidly wearing mechanical conveyors, which are a source of high maintenance cost and frequent trouble in previous systems, are eliminated in the device of the invention. Furthermore the previous systems referred to usually require a conveying fan to handle the material from the mechanical conveyor to the destination, so that the elimination of the mechanical conveyor reduces the power required to operate, and the air required by the conveying fan is drawn through the entire system and thereby assists in collecting the material prior to conveying it.

What is claimed is:

1. In a collecting and conveying system a pair of parallel pipes having a common dividing wall between them, means for intermittently effecting communication between the pipes at each of a plurality of successive places along said wall and means for exhausting air from said pipes to produce differential velocity of air movement through said pipes.

2. In a device of the class described the combination of a pair of conduits having a common open longitudinal way, a series of normally closed doors serving to seal said way and means for successively opening the doors.

3. In a device of the class described the combination of a pair of conduits having a common longitudinal opening, a series of normally closed doors sealing the opening, exhaust means for producing differential velocity of air pressure in said conduits and means for successively opening and closing the doors.

4. In a system of the class described the combination of a collecting conduit having low velocity air movement therethrough, a plurality of branch pipes adapted to discharge light and heavy materials into the collecting conduit through the agency of air movement, a pneumatic conveyor pipe having longitudinal open communication with the collecting pipe, a series of trap doors normally closing communication between said pipes, arms for effecting movement of the doors, and a moving cam for successively actuating the arms whereby each door is successively opened to permit materials from the collecting pipe to move into the conveyor pipe.

5. In a dust collecting system of the class described the combination of a pair of conduits, means for effecting a relatively low velocity movement of air through one conduit and high velocity movement of air through the second conduit, a series of branch pipes whereby waste materials may be directed into the first mentioned conduit from various selected sources, and means for effecting limited communication between the conduits successively along the length of the conduits.

6. In a system of the class described a pipe from which exhaust air is moved at low velocity for drawing materials thereinto, a second pipe from which air is exhausted at a high rate for producing high velocity movement of air therethrough and means whereby a communication is provided at successive intervals at successive points along the pipes for moving materials from the first pipe to the second pipe and permitting conveyance of said materials through the high velocity pipe.

7. In a dust collecting system of the class described the combination of a low velocity collecting pipe and a high velocity pneumatic conveyor pipe, means whereby materials may be directed to the collecting pipe from various sources and means to establish communication between the pipes intermittently and successively at a plurality of points along the length of said pipes.

8. In a dust collecting system of the class described a low velocity collecting pipe, means whereby materials may be directed to the collecting pipe from various sources and a high velocity conveyor pipe and means to successively effect communication between the pipes at a series of places along the pipes.

9. In a system of the class described the combination of a pair of pipes from which air is exhausted at different rates, the pipe of low rate of exhaustion being adapted to receive materials to be collected, branch pipes connecting with said pipes, and means whereby communication is had between said pair of pipes for permitting discharge into the second pipe, said second pipe serving as a pneumatic conveyor for removing the said material.

10. In a system of the class described the combination of a collecting pipe from which air is exhausted at a low rate, a substantially co-extensive conveyor pipe from which air is exhausted at a high rate, said pipes being adapted for constant communication with one another and means for exhausting the air from said pipes.

11. In a system of the class described the combination of a collector pipe, a substantially co-extensive conveyor pipe having constant limited communication therewith, suction means for effecting exhaust of air from the pipes at different rates and means for controlling the relative rates of air exhaust from the pipes.

12. In a dust collecting system the combination of a pair of substantially co-extensive pipes, means whereby air is exhausted from said pipes at different rates, and means whereby communication is established between the pipes and whereby materials collected in one of said pipes may be discharged into the other pipe to be conveyed by said other pipe.

13. In a system of the class described the combination of a collecting pipe, a conveyor pipe, an exhaust fan, means connecting the fan and pipes whereby air is exhausted at a low rate from the collecting pipe and at a high rate from the conveyor pipe, said collecting pipe serving to receive light and heavy material, an auxiliary fan and collector connected to the collecting pipe, said collector being arranged to discharge into the conveyor pipe.

14. In a dust collecting system a collecting pipe, branch conduits adapted to direct waste materials from various sources to the collecting pipe, a conveyor pipe extending beneath the collecting pipe and communicating therewith at intervals and means for withdrawing air from the conveyor pipe at high velocity and from the collecting pipe at a relatively low velocity whereby waste materials are drawn through the branch conduits to the collecting pipe and such waste materials are removed from the collecting pipe directly into the communicating conveyor pipe for movement and discharge thereby.

15. In a dust collecting system the combination of an upper conduit through which air is moved at a low velocity for drawing waste materials thereinto, a plurality of branch pipes for directing waste materials to said conduit, a lower conduit extending along the bottom of said upper conduit, and through which air is moved at a relatively high velocity, and means effecting communication between the pipes at intervals along said pipes.

16. In a dust collecting system the combination of an upper collecting conduit, a plurality of branch pipes whereby waste materials may be directed into said conduit, a second conduit along the bottom of said lower conduit and having communication therewith at intervals throughout the length of said conduits and means providing differential velocity air movement through said conduits.

In testimony whereof, we have hereunto subscribed our names this 9th day of July, 1927.

SYLVESTER W. KIRK.
WILLIAM ROGER MEUTTMAN.